(12) United States Patent
Oedegard et al.

(10) Patent No.: US 10,269,510 B2
(45) Date of Patent: Apr. 23, 2019

(54) COMBINED DISCHARGING AND GROUNDING DEVICE FOR A HIGH VOLTAGE POWER CONVERTER

(71) Applicant: ABB Schweiz AG, Baden (CH)

(72) Inventors: Bjoern Oedegard, Turgi (CH); David Weiss, Untersiggenthal (CH); Manfred Kipfer, Eschenbach (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/804,721

(22) Filed: Nov. 6, 2017

(65) Prior Publication Data

US 2018/0061588 A1   Mar. 1, 2018

Related U.S. Application Data

(63) Continuation of application No. PCT/EP2016/059733, filed on May 2, 2016.

(30) Foreign Application Priority Data

May 6, 2015   (EP) .................................... 15166644

(51) Int. Cl.
*H01H 3/40* (2006.01)
*H01H 3/46* (2006.01)
(Continued)

(52) U.S. Cl.
CPC ............... *H01H 3/46* (2013.01); *H01H 3/40* (2013.01); *H01H 31/003* (2013.01); *H02H 9/045* (2013.01); *H01H 31/28* (2013.01)

(58) Field of Classification Search
CPC .......... H01H 3/46; H01H 31/003; H01H 3/40; H01H 31/28; H02H 9/045
(Continued)

(56) References Cited

U.S. PATENT DOCUMENTS

2002/0057149 A1* 5/2002 Isaksson .................. H01H 9/42
335/172

FOREIGN PATENT DOCUMENTS

EP   1785560 A2   5/2007
JP   2000228807 A   8/2000

OTHER PUBLICATIONS

JP-2000-228807; Grounding Device; Date of filing: Apr. 2, 1999; Inventor: Nakano Yuta (Year: 2000).*
(Continued)

*Primary Examiner* — Dharti H Patel
(74) *Attorney, Agent, or Firm* — Taft Stettinius & Hollister LLP (57) ABSTRACT

Combined high voltage discharging and grounding device with a discharging unit with a first electric contact and a first counter-contact as well as a grounding unit with a second electric contact and a second counter contact. The first electric contact and the second electric contact are provided on a movable member which is movable by way of a drive along a path of movement from an open position to a close position. An electric contact between the first electric contact and the first counter-contact is established in an intermediate position between the open position and the closed position of the movable member when closing the discharging and grounding device in an operating state of the discharging and grounding device while the second electric contact is electrically still disconnected from the second counter contact.

20 Claims, 3 Drawing Sheets

(51) Int. Cl.
*H01H 31/00* (2006.01)
*H02H 9/04* (2006.01)
*H01H 31/28* (2006.01)

(58) Field of Classification Search
USPC .......................................................... 361/56
See application file for complete search history.

(56) References Cited

OTHER PUBLICATIONS

European Patent Office, International Search Report & Written Opinion issued in corresponding Application No. PCT/EP2016/059733, dated Jun. 16, 2016, 8 pp.
European Patent Office, Search Report issued in corresponding Application No. 15166644.3, dated Oct. 13, 2015, 3 pp.

\* cited by examiner

COMBINED DISCHARGING AND GROUNDING DEVICE FOR A HIGH VOLTAGE POWER CONVERTER

TECHNICAL FIELD

The invention relates to combined discharging and grounding devices employed for grounding capacitors (and other electric components) in high voltage power converters such as a multi-level converter, as well as high voltage power converters with such a combined discharging and grounding device.

BACKGROUND ART

A representative of prior art is JP2000-228807A, disclosing a combined discharging and grounding device is disclosed, which has a discharging unit with a first electric contact and a first counter-contact as well as a grounding unit with a second electric contact and a second counter contact. The first electric contact and the second electric contact are pro-vided on a pivotable arm member that is movable along a path of movement from an open position to a close position. The first electric contact is longer in dimension in the direction of the path of movement than the second contact such that an electric contact between the first electric contact and the first counter-contact is established in an intermediate position between the open position and the closed position of the movable member when closing the discharging and grounding device in an operating state of the discharging and grounding device while the second electric contact is electrically still disconnected from the second counter contact.

From similar devices it is known to connect the first electric contact via a discharge resistor to ground potential while the second electric contact is connected directly to ground potential. This way, the electric energy stored in a capacitor can be consumed by the discharge resistor prior to grounding it directly to ground potential when closing the combined discharging and grounding device. Direct grounding of the discharge resistors is a safety measure required for protecting an operator at the time of carrying out any maintenance operations in the electric device comprising the combined discharging and grounding device.

It is known that the full discharging of a capacitor or a capacitor bank in a classic high voltage device such as power converters requires quite some time, for example 30 to 40 minutes. Such a long time for grounding is dissatisfactory as it contributes substantially to long down times of the high voltage device. For that reason, there is an ever-rising demand for a quicker grounding procedure for fully grounding a complex device such as a multi-level power converter comprising several capacitors. Unfortunately, this contradicts the minimal required grounding time defined by the capacitors, in particular large capacitors in the millifarad range for high nominal voltages. The higher the rated current of a capacitors, the larger the overall cross-section of a conductor for discharging the capacitor and the longer the discharging time.

GENERAL DISCLOSURE OF THE INVENTION

For that reason, the object to be solved by the present invention resides in promoting a combined high voltage discharging and grounding device allowing for a quick overall grounding time while still addressing the long discharge times required by power capacitors.

In a most basic embodiment that object is solved by a combined high voltage discharging and grounding device for discharging and grounding at least one capacitor. The combined high voltage discharging and grounding device, comprises a discharging unit with a first electric contact and a first counter-contact, a grounding unit with a second electric contact and a second counter contact. The first electric contact and the second electric contact are provided on a movable member which is movable by way of a drive along a path of movement from an open position to a close position and vice versa. The first electric contact is offset by a first distance extending in the direction of the path of movement with respect to the second contact such that an electric contact between the first electric contact and the first counter-contact is established in an intermediate position between the open position and the closed position of the movable member when closing the discharging and grounding device in an operating state of the discharging and grounding device while the second electric contact is electrically still disconnected from the second counter contact. The movable member is coupled to the drive by a gear mechanism comprising a toggle lever which is shaped such that a speed of the movable member decreases progressively when passing the intermediate position from an open position towards a closed position.

Depending on the embodiment, the movable member is adapted to travel along an arcuate or along a linear path of movement.

Such a gear mechanism ensures that an insulating distance between the electric contacts and their counter contacts from an open position to an intermediate position can be covered relatively quickly upon closing the device, while a longer time window is available for performing the discharging an fully grounding operation. This way, it is possible to find a sound and fair balance between the contradicting demands of a quick coverage of the insulation distance and a long time window for discharging the capacitor or the capacitors.

A first advantage of employing a toggle lever mechanism resides in that the gear mechanism is far less complex than an electronically controlled two-stage drive system having two distinct operating speeds. Moreover, the proposed new gear mechanism requires no stopover in between two different speed ranges.

Although it is possible to dedicate a separate drive system to the discharge unit and the grounding unit, each, such a device is more expensive than the proposed one according to a basic embodiment of the present application, since it has more than one drive and more than one movable member.

A second advantage resides in that a gear mechanism with a toggle lever allows for employing a drive means with a constant revolution speed. Such drives are known to be far less expensive than drives with variable revolution speeds.

A third advantage resides in that a toggle lever mechanism requires no end position control for safeguarding that the movement is stopped once a closed position of the combined discharge and ground device is reached and for ensuring a precise end position of the movable member, in particular if the closed position of the device is achieved when the toggle lever is at its dead center.

A fourth advantage resides in that a torque required for reaching the closed positions from the intermediate position is reducible, which allows for employing small and thus a dimensionally compact drive.

The term 'gear mechanism comprising a toggle lever which is shaped such' shall be understood as a dimensioning and design of the gear mechanism geometry such that the desired effects are achievable.

In this document the term 'high voltage' is understood as a nominal voltage of at least 1000 volts, for example 1400 volts, 2800 volts or even higher voltages.

A good compromise between functionality and costs is achievable if the drive can put the toggle lever into motion by a joint of the toggle lever. The term 'joint' is understand in this application as the axle mechanically connecting the at least two shanks of the toggle lever.

The drive is formed by an electric motor that may be connected to a mechanical structure of the combined discharging and grounding devices in a pivoting manner, if required.

In a low-cost solution, the joint of the toggle lever has a nut portion engaging with a threaded spindle of the drive for moving the gear mechanism.

For ensuring that an electric device fitted with the combined discharging and grounding device can be grounded also in case of a power cut or another emergency situation, the threaded spindle is manually movable from the open position to the closed position.

A further important benefit of using a gear mechanism with a toggle lever resides in that it allows for mechanically positioning the first and second electric contacts relative to their counter contacts precisely without requiring an advanced end position detection of the position of the first and second electric contacts and a control system dedicated to the power supply of the drive. This holds particularly true if the closed position of the first and second electric contacts relative to their counter contacts is designed to be reached once the joint of the toggle lever reaches its dead center or is at least close to it. Owing to the fact that the relative movement of the first and second electric contacts relative to their counter contacts is close to zero when the joint approaches its dead center, the gear mechanism is quite insensitive to a precise spindle position of the threaded spindle relative to the nut portion of the joint. Therefore, it is possible to use inexpensive drives whose amount of revolutions of threaded spindle varies somewhat from a calculated optimum for sufficiently closing the combined discharging and grounding device.

If a drive with a constant revolution speed is employed, the movement speed of the movable member in between the open position and the closed position of the device is non-linear.

Another important benefit resides in that the geometric insensitivity of the relative position of the first and second electric contacts relative to their counter contacts forms a convenient means to make up for mechanical dimension tolerances requiring some lag of any electric contact systems.

A particular basic embodiment of a combined discharging and grounding device is achievable if the path of movement is arcuate and if the movable member is a pivotable arm that is rotatable about a pivot axis.

The shape of the first and second electric contact as well as of their dedicated counter-contacts may be optimized to match the arcuate path of movement, if required.

Combining the toggle lever and the pivotable arm of the gear mechanism allows for an increased design freedom and for adjusting a large movement speed control of the first and second electric contact, if the pivot axis is allocated at the pivotable arm such that a first lever arm between the pivot axis and the first electric contact and second electric contact is longer than a second lever arm between the pivot axis and a point of action connected with the toggle lever of the gear mechanism.

The overall number of parts required for the combined discharging and grounding device can be kept low if the first counter-contact is at least partially integrated into the second counter contact.

If several capacitors or capacitor banks shall be electrically grounded, it might be advantageous if the movable member carries a first set of first electric contacts and second electric contacts designed for mating with a second set of first counter-contacts and the second counter-contacts, respectively.

A particularly simple and reliable contact geometry is achievable if at least one of the first electric contact and the second electric contact is a contact blade.

As is known in the art, the time constant $\tau$ (tau) for discharging capacitors depends on the capacitance and the resistance of the discharge resistor. At a given capacitance, a sound choice of the resistance has to be made since it is not possible to choose any large arbitrary resistance because it leads to an excessively large discharging time and any small arbitrary resistance because it leads to high currents in the discharging current path. Having high currents in the latter case is disadvantageous in that it requires large cross sections of the conductor leading to bulky connectors to ground as well as to strong drives required for moving the movable member.

In an exemplary embodiment, the discharging of a 14 millifarads capacitor used for a rated discharge current of 2 amperes at 2800 volts nominal voltage of the capacitor is achievable in about 2 minutes. Expressed more generally, the gear mechanism and the drive are adapted for moving the movable member from the intermediate position to the closed position within 1.5 to 5 minutes, in particular within 2 to 3 minutes.

Depending on the requirements on the combined discharging and grounding device, a forerunning tip of the first electric contact is about 150 mm longer than a forerunning tip of the second electric contact, for example. The offset distance of the first and second electric contact relative to their dedicated counter-contacts, as well as the geometry of the gear mechanism comprising the toggle lever lead to the path-time diagram in between full electric insulation, discharging upon reaching the intermediate position and direct grounding eventually.

Again, depending on the requirements on the combined discharging and grounding device, an insulating distance of the combined discharging and grounding device from the tip of the first electric contact to the first counter contact is in a range of 200 to 400 mm, in particular in a range of 250 to 350 mm, for example.

Tests revealed that a satisfactory short overall grounding time of the combined discharging and grounding device is achievable if the gear mechanism and the drive are adapted for moving the movable member from the open position to the closed position within less than 20 minutes, in particular within less than 15 minutes or even about 10 minutes, only.

An excellent balance in between a small closing time of the combined discharging and grounding device is achievable if the gear mechanism comprising the toggle lever is designed such that the movable member covers at least 60% of a total movement distance extending from the open position to the closed position in less than 35% of a total closing time required by the movable member for covering the total movement distance extending from the open position to the closed position.

The term 'gear mechanism comprising a toggle lever being designed such' shall be understood as a dimensioning and design of the gear mechanism geometry such that the above-mentioned desired effects are achievable.

The above-mentioned advantages apply likewise to a high voltage converter, in particular a multi-level converter, comprising at least one capacitor which is connectable to ground potential by way of at least one combined discharging and grounding device as described above. In such a high voltage converter, the second electric contact is connected to ground potential via the structural body of the movable member while the first electric contact is connected to ground potential via at least one discharge resistor.

Depending on the nominal voltage of the capacitor, the capacitance of the at least one capacitor is in a range of 6 to 15 farad.

BRIEF DESCRIPTION OF THE DRAWINGS

The description makes reference to the annexed drawings, which are schematically showing in FIG. 1 a portion of an electric circuit of a converter comprising a high voltage discharging and grounding device for discharging and grounding capacitors.

In the drawings identical parts, currents and voltages are given identical reference characters.

WAYS OF WORKING THE INVENTION

Figure 1:
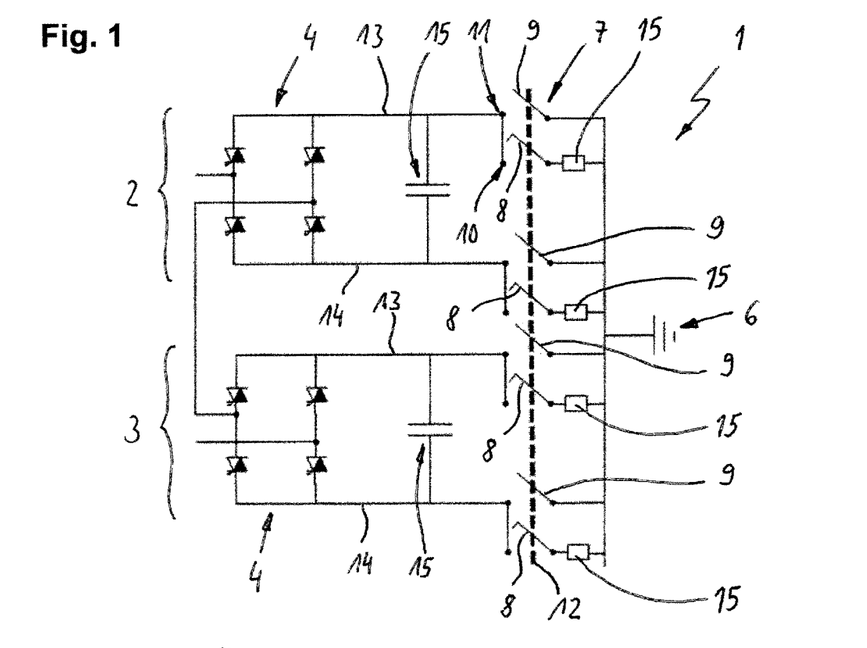

FIG. 1 shows a portion of an electric circuit of a high voltage converter 1 designed as a so-called multi-level converter. The converter comprises an upper branch 2 and a lower branch 3 with a power electronic module 4 and a capacitor 5, each.

These branches can be electrically grounded to ground potential 6 via a high voltage discharging and grounding device 7.

The discharging and grounding device 7 comprises a movable first electric contact 8 and a movable second electric contact 9 for contacting a first counter contact 10 and a second counter-contact 11 on each leg of the branches 2, 3.

The dashed line denotes a movable member to which the first electric contact and the second electric contact are connected in order to open and close them. The movable member is denoted by a dashed line tagged with reference character 12 in FIG. 1 and acts as a means for putting all movable first electric contacts 8 and a movable second electric contacts 9 into motion simultaneously. Thus, the first and second electric contacts and the first and second counter-contacts have been tagged with all reference characters only at the upper leg 13 of the upper branch 2 only, for enhanced readability of the circuit. Again for simplicity, all reference characters except the ones for the first electric contact 8 and the second electric contact 9 have been omitted in FIG. 1, only.

FIG. 1 discloses further that the upper leg 13 and the lower leg 14 of each branch 2, 3 serve for discharging and connecting both ends of the capacitor 5 to ground potential 6 in a closed position of the discharging and grounding device 7. FIG. 1 shows in connection with FIGS. 2 to 4 that upon closing the discharging and grounding device 7 an electric connection of the legs 13, 14 to ground potential 6 is established by the first counter-contact 10 and the first electric contact 8 via a discharge resistor 15 before the electric connection of the second counter-contact 11 and the second electric contact 9 directly to ground potential 6 is established.

Figure 2:
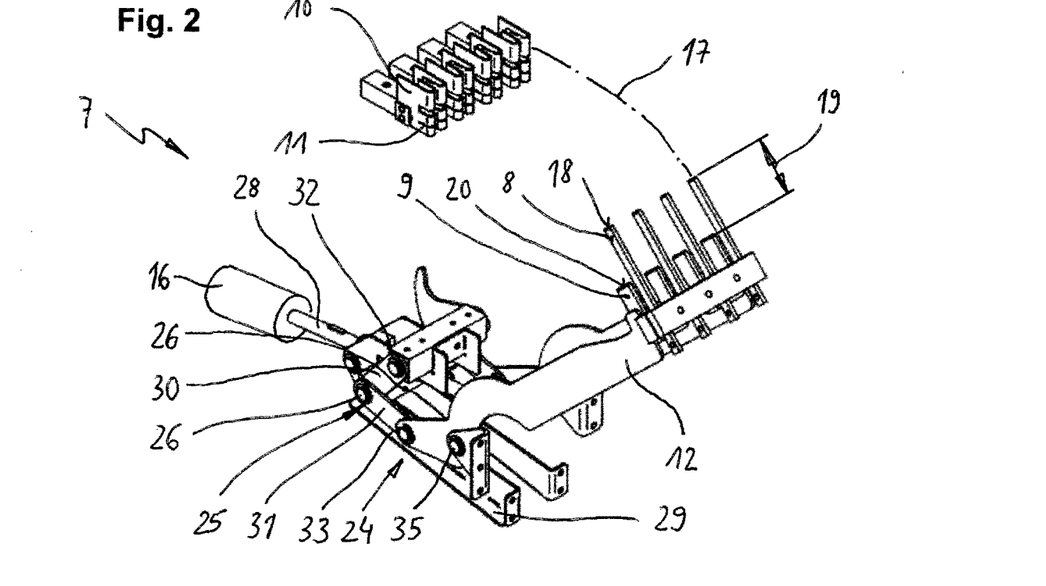
FIG. 2 a combined high voltage discharging and grounding device having a movable member shown in its open position.

In FIG. 2, an exemplary embodiment of the combined high voltage discharging and grounding device 7 is shown. The first electric contact 8 and the second electric contact 9 are provided on a movable member 16 which is movable by way of a drive 16 having a constant revolution speed along an arcuate path of movement 17 from an open position to a close position and vice versa. The first electric contact 8, i.e. its first leading tip 18 is offset by a first distance 19 extending in the direction of the path of movement 17 with respect to the second contact 9, i.e. its second leading tip 20.

The first electric contact 8 and the first counter-contact 10 belong functionally to a discharging unit 21 whereas the second electric contact 9 and the second counter-contact 11 belong functionally to a grounding unit 22.

The movable member 12 is coupled to the drive 16 by a gear mechanism 24 comprising a toggle lever 25. The toggle lever 25 in turn can be put into motion by a joint 26 of the toggle lever 25. In more detail, the joint 26 of the toggle lever 25 has a nut portion 27 (see FIG. 4) that is engaging with a threaded spindle 28 of the drive 16 for moving the gear mechanism 24.

Figure 3:
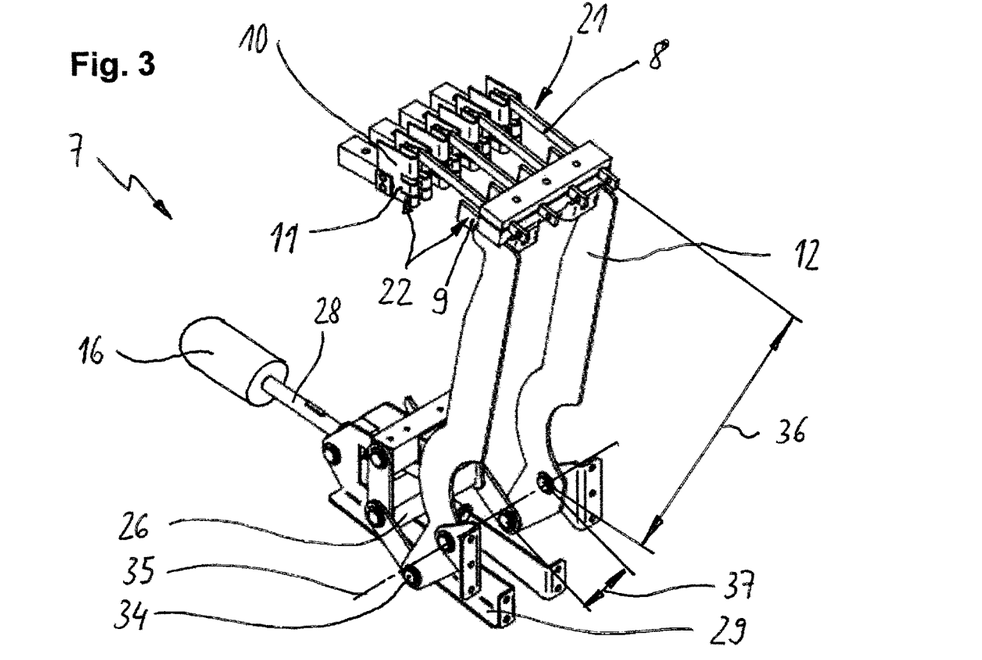
FIG. 3 the combined high voltage discharging and grounding device of FIG. 2 where the movable member is shown in its intermediate position.
Figure 4:
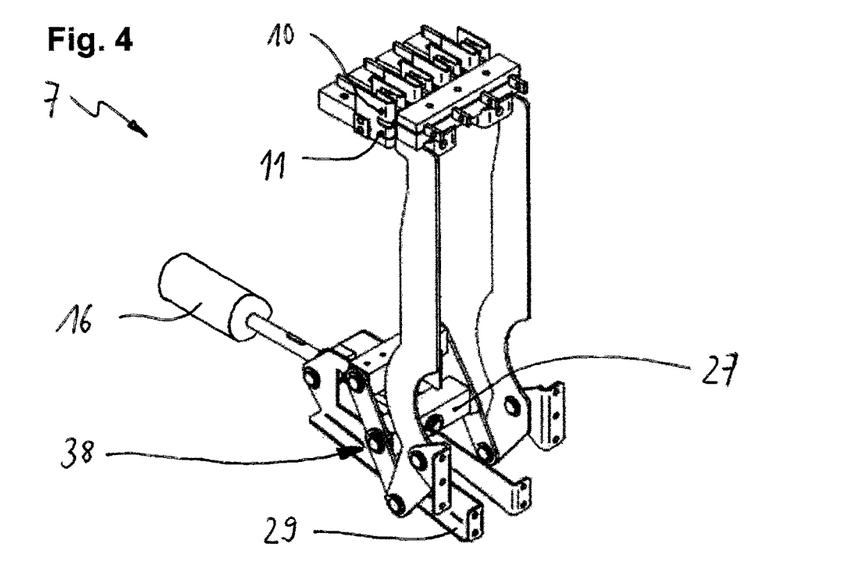
FIG. 4 the combined high voltage discharging and grounding device of FIG. 2 where the movable member is shown in its closed position.

As shown in FIGS. 2 to 4, the orientation of the rotation axis of the threaded spindle 28 varies depending on the position of the nut portion 27 in the joint 26 relative to a longitudinal position of the latter on the threaded spindle 28. Hence, the electric motor of the drive is connected to a mechanical structure 29 of the combined discharging and grounding device 7 in a pivoting manner.

The joint 26 of the toggle lever 25 is mechanically connecting a first shank 30 and a second shank 31 of the toggle lever 25 such that it form an axle mechanically connecting the at least two shanks of the toggle lever as well as forming the nut portion 27.

As evident from FIGS. 2 to 4, a first end 32 of the first shank 30 is mechanically connected to mechanical structure 29 of the combined discharging and grounding device 7 while a second end 33 of the second shank 31 is mechanically connected to a point of action 34 at an end portion 34 of the movable member 12. That point of action 34 at the end portion is located at an opposite end of the movable member 12 with respect to the first electric contact 8 (see FIG. 3).

The movable member 12 is a pivotable arm that is rotatable about a pivot axis 35 fastened to the mechanical structure 29 of the combined discharging and grounding device 7. The pivot axis 35 is allocated at the pivotable arm 12 such that a first lever arm 36 extending between the pivot axis 35 and the first electric contact 8 and second electric contact 9 is longer than a second lever arm 37 extending between the pivot axis 35 and the point of action 34 connected with the toggle lever 25 of the gear mechanism 24.

The threaded spindle 28 is manually movable from the open position to the closed position in case of emergency, for example by a crank mechanism (not shown) that may be mechanically connected to the threaded spindle 28 only when needed.

In addition to the description relating to FIG. 2 shows FIG. 3 the situation upon closing the combined high voltage discharging and grounding device of FIG. 2 where the movable member 12 is shown in an intermediate position. The intermediate position is reached at the time of closing the combined high voltage discharging and grounding device as soon as an electric connection in between the first electric contact 8 and its dedicated first counter-contact 10 is reached. In this intermediate position, the second electric contact 9 is electrically still disconnected from its dedicated second counter contact 11. In comparison to FIG. 2 the joint 26 has been moved by the threaded spindle 28 off the drive 16 causing the toggle lever to open such that an angle delimited by the first shank 30 and the second shank 31 is increased.

In addition to the description relating to FIG. 3 shows FIG. 4 the situation upon further closing the combined high voltage discharging and grounding device of FIG. 3 where the movable member 12 is shown in a closed position. In this closed position, the second electric contact 9 (hidden in FIG. 4) is now electrically connected to its dedicated second counter-contact, too, while the first electric contact 8 (partially hidden in FIG. 4) is still electrically connected to its dedicated first counter-contact 10.

In comparison to FIG. 3 the joint 26 has been moved even further towards its dead center 38 by the threaded spindle 28 off the drive 16 causing the toggle lever to open such that an angle delimited by the first shank 30 and the second shank 31 is maximal or close to maximal.

Please note that all electric connections from the capacitor to the counter-contacts as well as from the first electric contacts to the discharge resistor and from the second electric contacts to ground potential have been omitted for a better understanding of the gear mechanism and the toggle lever.

Figure 5:
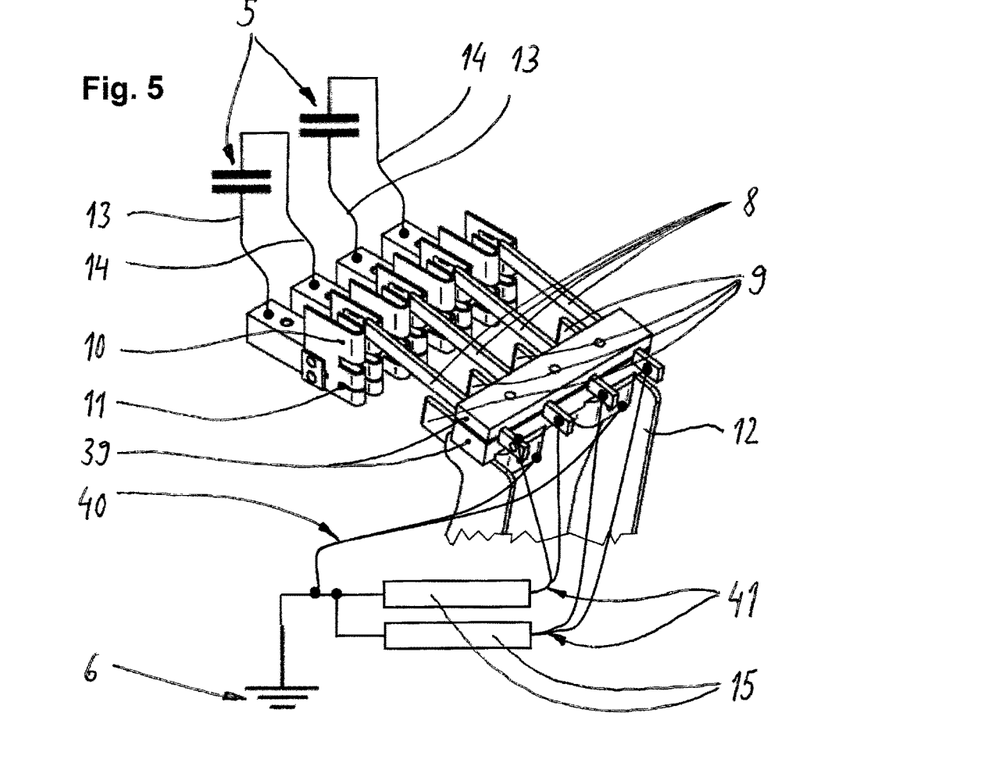
FIG. 5 an extended close-up of the contact situation of FIG. 3.

FIG. 5 shows an extended close-up of the contact situation of FIG. 3. This time, the electric connections from the capacitors 5 to the counter-contacts 10, 11 as well as the electric connections 41 from the first electric contacts 8 to the discharge resistor 15 and the connections 40 from the second electric contacts 10 to ground potential 6 are indicated to match a portion of the circuit shown in FIG. 1.

FIG. 5 reveals that the first counter-contact 10 is at least partially integrated into the second counter contact 11. In fact, FIG. 5 discloses that the movable member 12 carries a first set of first electric contacts 8 and second electric contacts 9 designed for mating with a second set of first counter-contacts 10 and the second counter-contacts 11, respectively. Both the first electric contacts 8 and the second electric contacts 9 are designed as contact blades.

FIG. 5 shows that the actual first electric contacts 8 are electrically insulated from the actual second electric contacts 9 by an insulating member 39.

Figure 6:
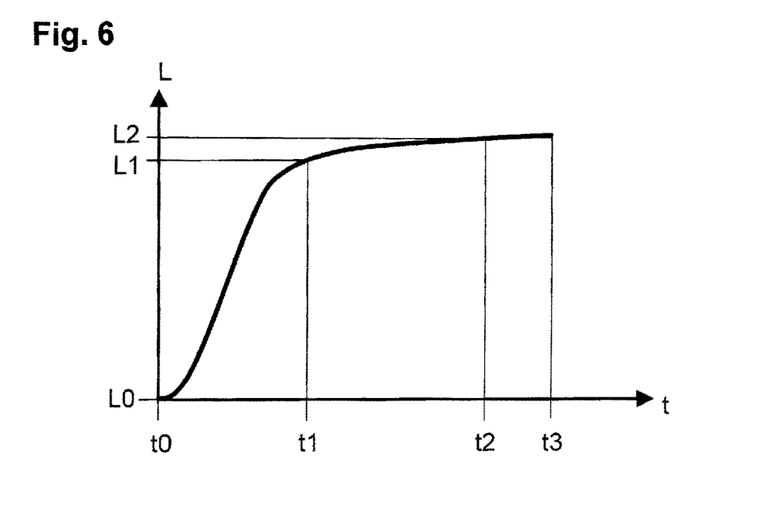
FIG. 6 a path-time diagram of the movable member in between its open position and its closed position.

FIG. 6 shows a path-time diagram of the movable member 12 in between its open position and its closed position. L denotes the path axis, whereas t denotes the time axis. Let us briefly recall that FIGS. 2 to 4 show in combination with FIG. 6 that the gear mechanism 24 comprising the toggle lever 25 are designed in the sense of shaped and dimensioned such that a speed of the movable member 12 decreases progressively when passing the intermediate position from an open position towards the closed position.

As displayed in the graph of FIG. 6, the mechanical gear 24 with the toggle lever 25 is designed such that the movable member covers at least 60% of a total movement distance extending from the open position at t0 to the closed position at t3 in less than 35% of a total closing time (i.e. between t0 and t1) required by the movable member for covering the total movement distance extending from the open position to the closed position. Again, the intermediate position is reached at t1. An electric connection in between the second electric contact 9 and its dedicated second counter-contact 10 is established at time t2. At t2 the discharge resistor 15 is electrically bypassed by the direct connection 40 electrically connected to the second contacts 9 (see FIG. 5).

FIG. 6 further shows that only very little path (L) remains to be covered from time t2 to t3 as the joint is proximate to its dead center 38. That illustrates the geometric insensitivity of the relative position of the first and second electric contacts relative to their counter contacts at the closed position of the combined discharging and grounding device.

LIST OF REFERENCE NUMERALS

1 high voltage converter
2 upper branch
3 lower branch
4 power electronic module
5 capacitor
6 ground potential
7 combined discharging and grounding device
8 first electric contact
9 second electric contact
10 first counter-contact
11 second counter-contact
12 movable member
13 upper leg
14 lower leg
15 discharge resistor
16 drive
17 path of movement
18 first leading tip
19 offset/first distance
20 second leading tip
21 discharging unit
22 grounding unit
24 gear mechanism
25 toggle lever
26 joint of the toggle lever
27 nut portion of the joint
28 threaded spindle
29 mechanical structure of the combined discharging and grounding device
30 first shank
31 second shank
32 first end of the first shank
33 second end of the second shank
34 point of action at an end portion of the movable member
35 pivot axis of the movable member
36 first lever arm
37 second lever arm
38 dead center of the joint of the toggle lever
39 insulating member
40 connections from the second electric contacts to ground potential
41 connections from the first electric contacts to the discharge resistor

The invention claimed is:

1. A combined high voltage discharging and grounding device for discharging and grounding at least one capacitor, comprising:
 a discharging unit with a first electric contact and a first counter-contact,
 a grounding unit with a second electric contact and a second counter contact,
 wherein the first electric contact and the second electric contact are provided on a movable member which is movable by way of a drive along a path of movement from an open position to a close position and vice versa, wherein the first electric contact is offset by a first distance extending in the direction of the path of movement with respect to the second contact such that an electric contact between the first electric contact and the first counter-contact is established in an intermediate position between the open position and the closed position of the movable member when closing the discharging and grounding device in an operating state of the discharging and grounding device while the second electric contact is electrically still disconnected from the second counter contact,
 wherein the movable member is coupled to the drive by a gear mechanism comprising a toggle lever which is shaped such that a speed of the movable member decreases progressively when passing the intermediate position from an open position and moving towards a closed position.

2. The combined high voltage discharging and grounding device according to claim 1, wherein the drive can put the toggle lever into motion by a joint of the toggle lever.

3. The combined high voltage discharging and grounding device according to claim 2, wherein the grounding device is in its closed position once the joint of the toggle lever reaches its dead center.

4. The combined high voltage discharging and grounding device according to claim 2, wherein the path of movement is arcuate and in that the movable member is a pivotable arm that is rotatable about a pivot axis.

5. The combined high voltage discharging and grounding device according to claim 1, wherein the joint of the toggle lever has a nut portion engaging with a threaded spindle of the drive for moving the gear mechanism.

6. The combined high voltage discharging and grounding device according to claim 5, wherein the threaded spindle is manually movable from the open position to the closed position in case of emergency.

7. The combined high voltage discharging and grounding device according to claim 1, wherein the grounding device is in its closed position once the joint of the toggle lever reaches its dead center.

8. The combined high voltage discharging and grounding device according to claim 1, wherein the path of movement is arcuate and in that the movable member is a pivotable arm that is rotatable about a pivot axis.

9. The combined high voltage discharging and grounding device according to claim 8, wherein the pivot axis is allocated at the pivotable arm such that a first lever arm between the pivot axis and the first electric contact and second electric contact is longer than a second lever arm between the pivot axis and a point of action connected with the toggle lever of the gear mechanism.

10. The combined high voltage discharging and grounding device according to claim 1, wherein the first counter-contact is at least partially integrated into the second counter contact.

11. The combined high voltage discharging and grounding device according to claim 1, wherein the movable member carries a first set of first electric contacts and second electric contacts designed for mating with a second set of first counter-contacts and the second counter-contacts, respectively.

12. The combined high voltage discharging and grounding device according to claim 1, wherein at least one of the first electric contact and the second electric contact is a contact blade.

13. The combined high voltage discharging and grounding device according to claim 1, wherein the gear mechanism and the drive are adapted for moving the movable member from the intermediate position to the closed position within 1.5 to 5 minutes.

14. The combined high voltage discharging and grounding device according to claim 1, wherein the gear mechanism and the drive are adapted for moving the movable member from the open position to the closed position within less than 20 minutes.

15. The combined high voltage discharging and grounding device according to claim 1, wherein the gear mechanism comprising the toggle lever is designed such that the movable member covers at least 60% of a total movement distance extending from the open position to the closed position in less than 35% of a total closing time required by the movable member for covering the total movement distance extending from the open position to the closed position.

16. The combined high voltage discharging and grounding device according to claim 1, wherein the gear mechanism and the drive are adapted for moving the movable member from the intermediate position to the closed position within 2 to 3 minutes.

17. The combined high voltage discharging and grounding device according to claim 1, wherein the gear mechanism and the drive are adapted for moving the movable member from the open position to the closed position within less than 15 minutes.

18. A high voltage converter comprising at least one capacitor which is connectable to ground potential by way of at least one combined discharging and grounding device, the at least one combined discharging and grounding device comprising:
 a discharging unit with a first electric contact and a first counter-contact,
 a grounding unit with a second electric contact and a second counter contact,
 wherein the first electric contact and the second electric contact are provided on a movable member which is movable by way of a drive along a path of movement from an open position to a close position and vice versa, wherein the first electric contact is offset by a first distance extending in the direction of the path of movement with respect to the second contact such that an electric contact between the first electric contact and the first counter-contact is established in an intermediate position between the open position and the closed position of the movable member when closing the discharging and grounding device in an operating state of the discharging and grounding device while the second electric contact is electrically still disconnected from the second counter contact,
 wherein the movable member is coupled to the drive by a gear mechanism comprising a toggle lever which is shaped such that a speed of the movable member decreases progressively when passing the intermediate position from an open position and moving towards a closed position, and wherein the second electric contact is connected to ground potential via the movable member, while the first electric contact is connected to ground potential via at least one discharge resistor.

19. The high voltage converter according to claim 18, wherein a capacitance of the at least one capacitor is in a range of 6 to 15 millifarads.

20. The high voltage converter according to claim 18, wherein the high voltage converter is a multi level converter.

* * * * *